Jan. 9, 1951 P. F. SKOOG 2,537,918
CORE ASSEMBLY MACHINE
Filed April 28, 1947 2 Sheets-Sheet 1
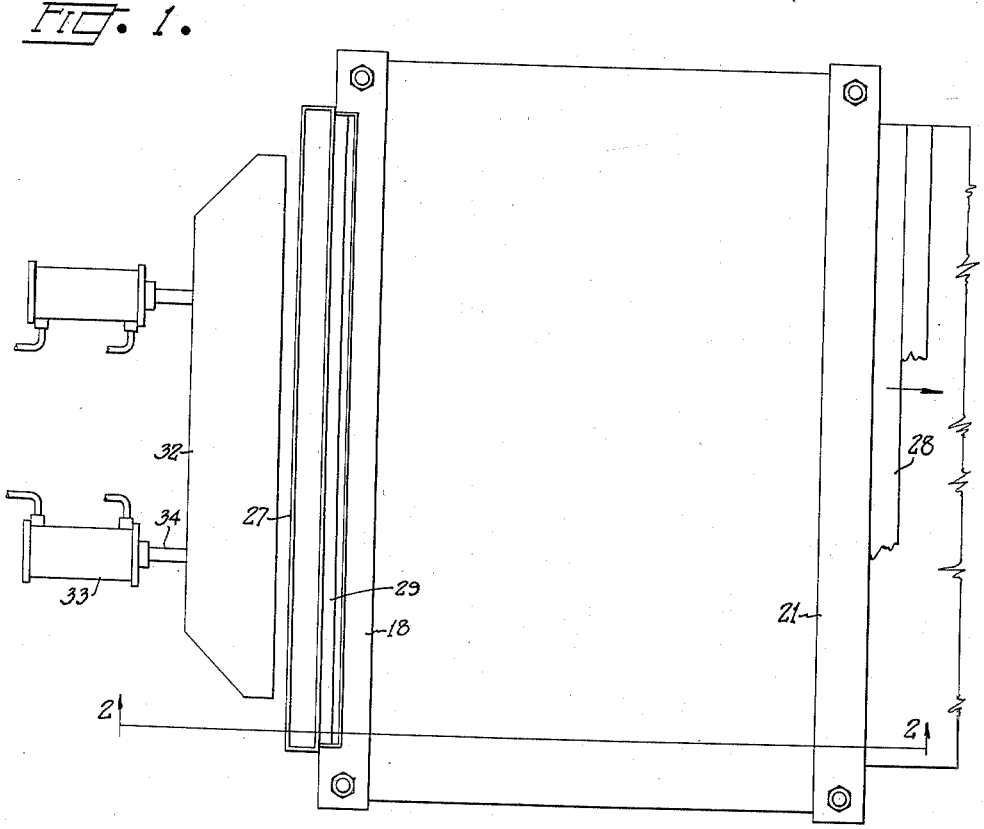
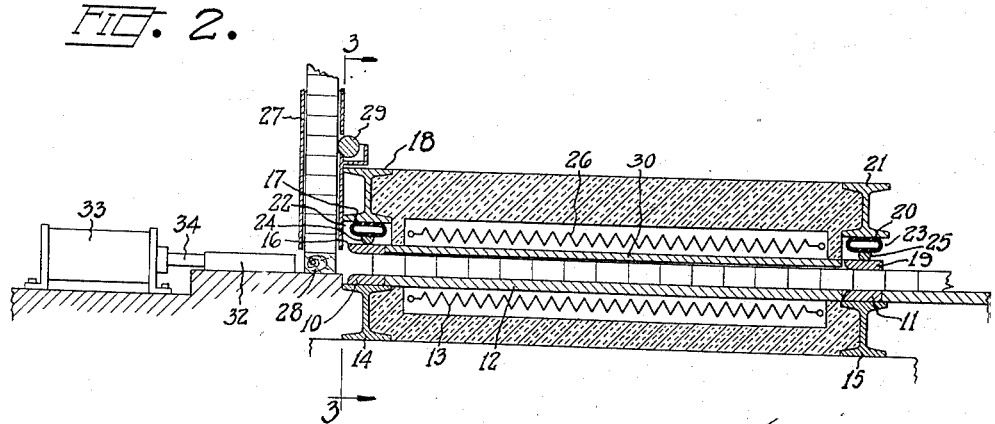
INVENTOR
PER F. SKOOG
BY
ATTORNEY Jan. 9, 1951 P. F. SKOOG 2,537,918
CORE ASSEMBLY MACHINE
Filed April 28, 1947 2 Sheets-Sheet 2
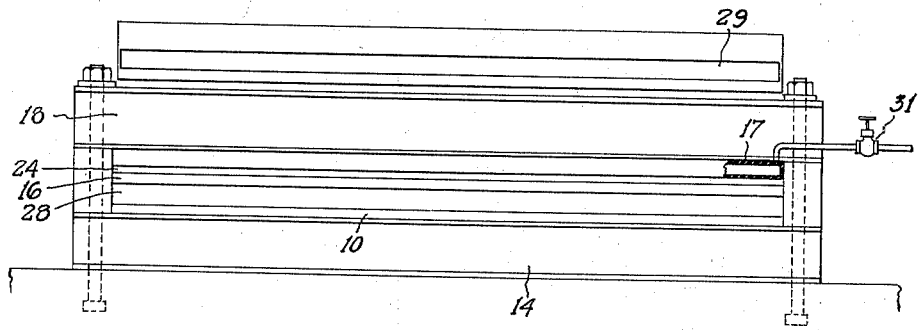
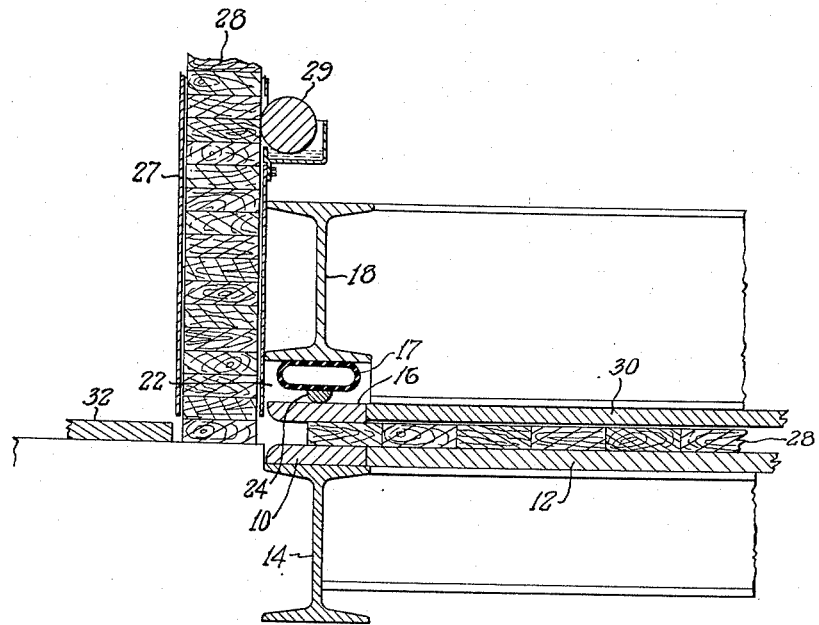
INVENTOR
PER F. SKOOG
BY E. B. Birkenbeuel
ATTORNEY Patented Jan. 9, 1951

2,537,918

UNITED STATES PATENT OFFICE 2,537,918

CORE ASSEMBLY MACHINE

Per F. Skoog, Olympia, Wash.

Application April 28, 1947, Serial No. 744,345

1 Claim. (Cl. 154—1)

This invention relates generally to the wood working industry and particularly to a method of and apparatus for forming cores.

The main object of this invention is to make possible the formation of a continuous core of wood, to save labor in doing so and to insure a satisfactory and uniform gluing action throughout the core.

The second object is to make possible the formation of cores of any length and width from remnants and edgings of lumber or plywood.

These and other objects are accomplished in the manner set forth in the following specification as illustrated in the accompanying drawing, in which:

Fig. 1 is a plan of the apparatus.

Fig. 2 is a section taken along the line 2—2 in Fig. 1.

Fig. 3 is a section taken along the line 3—3 in Fig. 2.

Fig. 4 is an enlarged section also taken along the line 2—2 in Fig. 1.

Referring in detail to the drawings, there is shown a lower inlet jaw 10 which is parallel with and substantially level with the lower outlet jaw 11 between which is disposed a table or ways 12 which is flush with the two surfaces of the jaws 10 and 11. It is desirable to provide a heating element 13 under the surface of the table 12. The jaws 10 and 11 are strongly supported by the I beams 14 and 15.

Above the inlet jaw 10 is a movable inlet jaw 16 which is urged downwardly by the pneumatic cushion 17 which is disposed along the underside of the I beam 18. Spaced above the lower outlet jaw 11 is an upper outlet jaw 19 which is urged downwardly by the pneumatic cushion 20 which is disposed against the underside of the I beam 21. It will be noted that the cushions 17 and 20 are in channels 22 and 23 and are separated from the jaws 10 and 11 by narrow strips 24 and 25.

A heating element 26 is placed above the underside of the jaws 16 and 19. A magazine 27 for strips 28 is disposed along the inlet jaws of the machine. Suitable glue applying rolls 29 are also provided. Guides or ways 30 are provided between the members 18 and 21 and their purpose is to loosely guide the forming core from the inlet jaws 10 and 16 to the outlet jaws 11 and 19.

Suitable means are provided for maintaining the desired pressure on the cushions 17 and 20. This can be accomplished easily by an air inlet valve 31 which can be connected to an air hose in the same manner as is a pneumatic tire.

Movable under the magazine 27 and toward the jaws 10 and 16 is a pressure bar 32 to which pressure may be applied by one or more cylinders 33 whose pistons 34 are connected to the bar 32.

The operation of the apparatus and the practice of my method is as follows:

Assuming that there is a supply of strips 28 in the magazine 27 and that glue is being supplied to one or both edges of the lowermost strip 28 and pressure is brought to bear on the strip which will force it into the space between the jaws 10 and 16, it follows that each time the bar 32 is withdrawn another strip 28 will come into position and the next feeding movement of the bar 32 will force the first strip out of the clamping jaws 10 and 11 into the space between the heating elements 13 and 26 and so on until the outlet jaws 11 and 19 are reached, and this will require additional pressure in order for the core to pass out of the machine.

Obviously, the rate of feeding of the strips 28 and the spacing of the jaws 10 and 11, as well as the kind of glue used, must be such as to insure a safe setting of the glue before the core is ejected.

In some cases a crank action can be employed instead of the ram as shown. Thus, it can be seen that cores of any length can be made in a continuous manner and the pressure applied in a uniform manner and in the proper direction.

In some cases where special glues are used, the heating elements may be dispensed with.

I claim:

A core assembling machine having in combination a pair of horizontal ways between which a core can freely pass, a pair of jaws at each end of said ways, one jaw of each pair being yieldable and the other fixed, pneumatic means for urging the yieldable jaw of each pair toward the fixed jaw, a magazine for feeding strips of core material in front of the jaws at the inlet end of the machine, means for applying glue to the strips as they leave the magazine, a pressure bar for pushing each strip from the bottom of the magazine and between the first pair of jaws and means for supplying heat to the core as it passes between said ways.

PER F. SKOOG.

REFERENCES CITED

The following references are of record in the file of this patent:

UNITED STATES PATENTS

| Number | Name | Date |
|---|---|---|
| 647,056 | Ward | Apr. 10, 1900 |
| 794,873 | Mayhew | July 18, 1905 |
| 794,874 | Mayhew | July 18, 1905 |
| 1,693,606 | Jones | Dec. 4, 1928 |
| 1,702,185 | Weber | Feb. 12, 1929 |
| 2,135,763 | Nicholson | Nov. 8, 1938 |
| 2,344,488 | Bowling | Mar. 21, 1944 |
| 2,366,588 | Bolling | Jan. 2, 1945 |
| 2,378,244 | Pfenning | June 12, 1945 |
| 2,408,064 | Hall | Sept. 24, 1946 |
| 2,409,777 | Maurer | Oct. 22, 1946 |
| 2,453,185 | Bilhuber | Nov. 9, 1948 |

FOREIGN PATENTS

| Number | Country | Date |
|---|---|---|
| 506,780 | Great Britain | June 5, 1939 |